Patented May 23, 1939

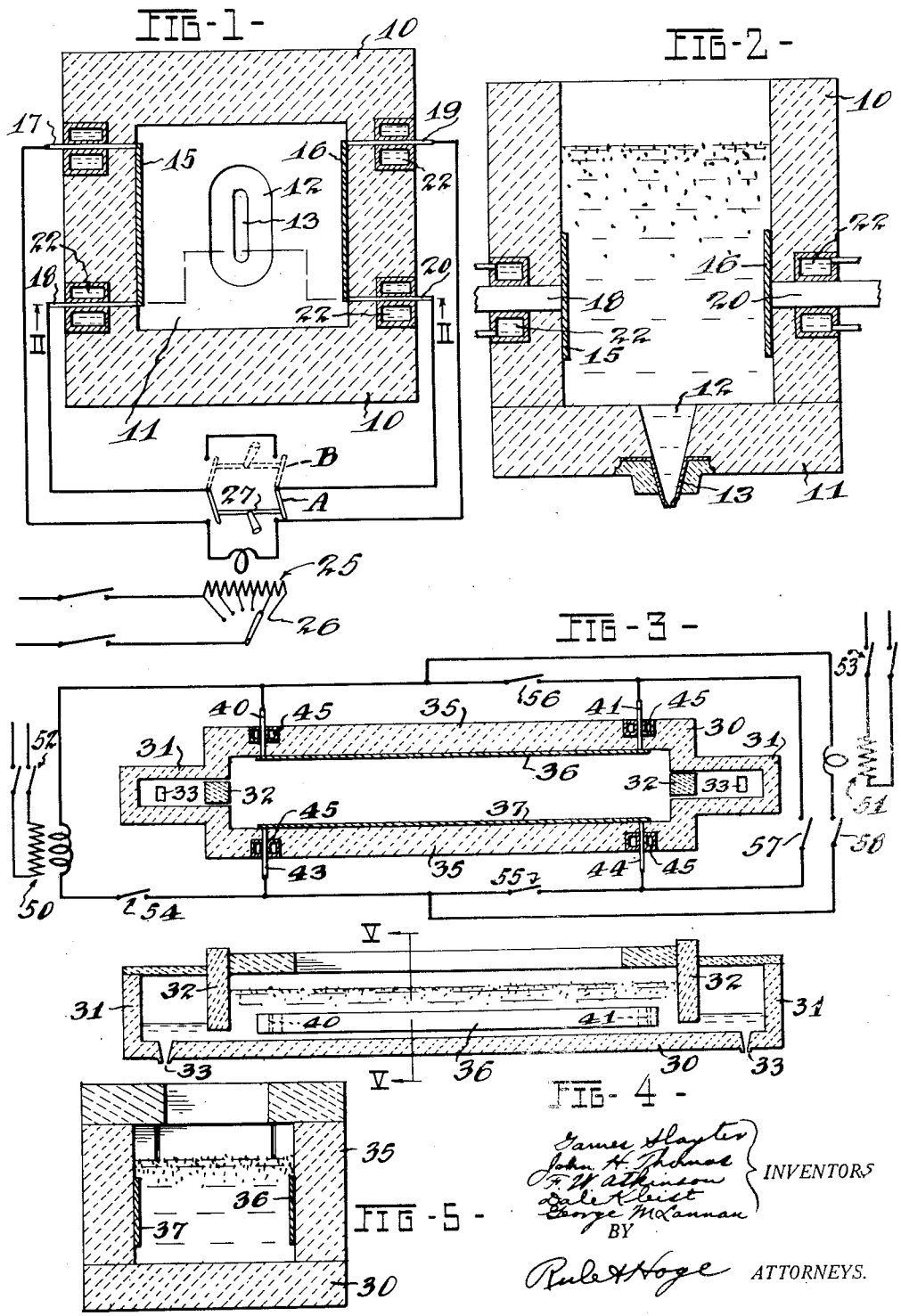

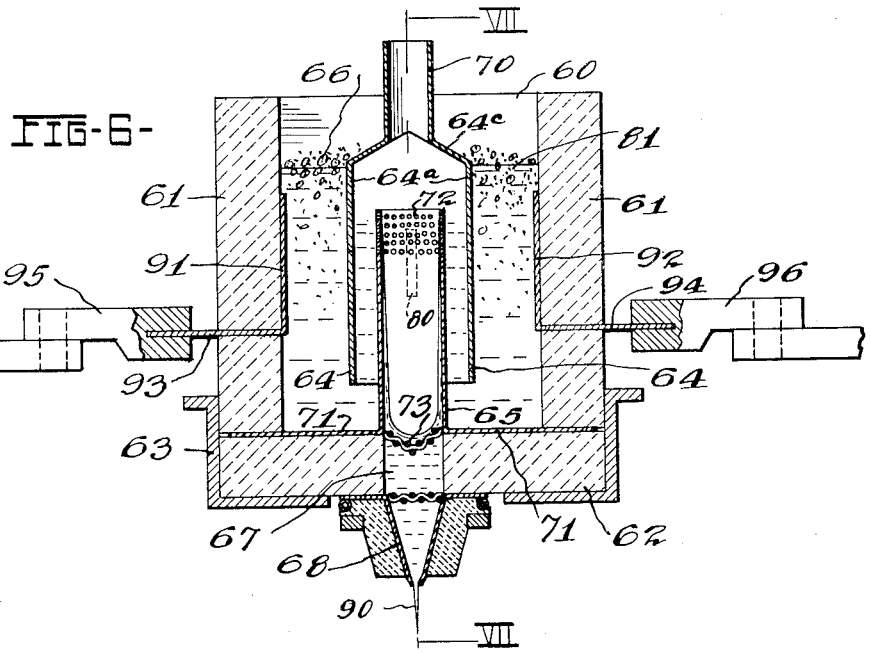

2,159,361

UNITED STATES PATENT OFFICE 2,159,361

ELECTRIC FURNACE

Flavius W. Atkinson, Dale Kleist, Games Slayter, John H. Thomas, and George M. Lannan, Newark, Ohio, assignors to Owens-Illinois Glass Company, a corporation of Ohio Application November 30, 1936, Serial No. 113,366

9 Claims. (Cl. 13—6)

Our invention relates to improved methods and apparatus for melting and refining refractory and vitreous materials, such as a solution of metal oxides in silica, including glasses generally and similar substances which are melted and refined at high temperatures. The invention is herein particularly described as adapted and used in melting and fining glass, but it will be understood that the invention is not limited to such use but comprehends the treatment of various other substances.

The present invention also relates in part to a new method and apparatus for melting glass and similar materials and more particularly to certain novel improvements in the electrodes and their electrical hook-up for certain novel purposes.

An object of the invention is to provide a novel and practical apparatus by which the raw glass batch or the like is melted and fined rapidly and economically, with the expenditure of a comparatively small amount of heat and with a furnace or apparatus which is small as compared with furnaces of the type now in general use, of equal productive capacity.

A large proportion of the glass which is manufactured at the present day is melted and refined to tanks of many tons capacity. The raw materials are introduced into the furnace at one end thereof and melted by heat applied to the top surface of the melting mass. The glass as it is melted and refined moves forward slowly through the furnace, the mass usually being several feet in depth. By a slow refining process a large quantity of seeds or gas bubbles which permeate the mass are caused to rise to the surface of the glass and are dissipated. From the time the raw batch is introduced until it has been refined and withdrawn from the furnace is usually many hours. The great length of time required for fining is due in part to the fact that the seeds or gas bubbles are carried downward by convection currents to considerable depths during the melting process, a large portion of the gases being dissolved, due to the pressure to which they are subjected. Owing to the viscous and sluggish nature of the molten glass, the undissolved gases or seeds rise to the surface very slowly, where they are dissipated. The head of glass also causes a pressure on the submerged seeds, which reduces their size and increases the sluggishness and difficulty with which they escape. As the submerged portions of glass rise toward the surface, the dissolved gases are liberated to a large extent and again appear as seeds which must be removed to complete the refining process. During the melting and refining process, a large amount of the heat supplied to the glass is lost through radiation. A considerable amount is also lost by convection and by conduction through the furnace walls.

An object of our invention is to overcome these objections and provide a method and apparatus by which the raw glass batch may be rapidly melted and refined, by which heat losses may be reduced to a minimum and by which a large output of the refined product may be obtained with a very small furnace or apparatus as compared with furnaces now in general use. For the attainment of this object, the invention in its preferred form comprises a refractory furnace within which are placed electrical heating, melting and refining elements constructed and arranged in a manner to permit a continuous melting, fining and discharge of the material introduced into the furnace.

Another object of the present invention is to achieve greater melting efficiencies for glass and to produce a clearer, brighter blass which is free from impurities which ordinarily enter the glass from the electrical heating elements or electrodes.

It is another object of the present invention to provide an electrical glass furnace capable of melting the cold batch by means of electricity at at start of the operation without the necessity of preheating the glass to a temperature at which it will convey current by means of gas burners or other apparatus extraneous to the electric melting elements or electrodes of the furnace.

A further object of the present invention is to increase the rate of electrical energy dissipation within the furnace without danger of burning out or disintegrating the electrodes or causing a discoloration or adulteration of the glass itself.

Still another object of the present invention is to provide electrodes which are adapted to impart electrical energy to the glass at a much higher temperature than was considered possible heretofore, to the end that the current density and temperature at various portions of the electrodes may be substantially increased and thereby permit the glass to carry current in a more perfectly ionized state. In this connection it is also an aim of the invention to achieve and maintain a glass throughout or rate of movement of glass through the furnace which is far greater, compared to the size of the furnace, than has heretofore been considered possible, whereby there is a correspondingly high generation of energy per unit of melting space and a consequent minimization of radiating surface and heat losses. By increasing the rate of heat liberation, we have proposed to materially lessen to a negligible degree the proportionate area of waste heat radiation.

The present invention also relates to a new method and apparatus for melting glass, in which the glass is subjected to heating both by resistance heating in the glass itself caused by the introduction of current through electrodes, and by the resistance heating in the bushing and the electric heating elements of the furnace.

A further object attained by a modified form of the invention is to provide an arrangement by which the glass or other material, as it is melted, is caused to flow in sheet formation or a very thin stream over the heating element in a manner to permit the ready escape of seeds or gas bubbles. The invention further provides means whereby the sheet of glass flowing over the heating element is maintained at such high temperature that the glass is highly liquid and free from the usual surface layer of chilled glass which would prevent the ready escape of the seeds. The invention further comprehends a novel arrangement by which the raw materials as they are fed forward to the heating elements are interposed between the latter and the furnace walls in a manner to absorb practically all the heat transmitted from said elements without permitting any considerable amount of heat to reach the furnace walls, thereby preventing heat losses by radiation or by conduction through the furnace walls.

Other objects of the invention will appear hereinafter.

Referring to the accompanying drawings:

Fig. 1 is a dagrammatic plan view, shown partly in section, of our novel furnace shown in relationship to the electrodes and a possible hook-up of the electrical connections;

Fig. 2 is an elevational sectional view taken along the line II—II of Fig. 1;

Fig. 3 is a diagrammatic plan view of a modified embodiment of the present invention, illustrating a modified electrical hook-up;

Fig. 4 is an elevational longitudinal sectional view of the furnace illustrated in Fig. 3;

Fig. 5 is a sectional end view of the furnace taken along the line V—V of Fig. 4;

Fig. 6 is an elevational cross-section view of a modified embodiment of the present invention showing the combined use of electrodes and resistors for melting and refining glass; and Fig. 7 is a cross-section view of the same modified embodiment, the section being taken along lines VII—VII of Fig. 6.

Ordinary glass or glass batch, as is commonly known, is a nonconductor of electricity at room temperatures. Glass, when subjected to an electromotive force, begins to carry current, however, when it is heated to about the softening point, that is, gets sticky. For ordinary glasses, such as lime glasses, his temperature is generally in the neighborhood of about 1200° F. and this is the point at which the glass begins to ionize. However, it is not until about 1800° F. that the glass begins to carry current effectively. When the glass is heated still higher, it becomes an excellent conductor of electricity so that it requires a much lower voltage to dissipate a large amount of energy therein, than if the current were introduced at a lower temperature.

The prior art commonly used iron, iron alloys, or carbon for electrodes, but these had the serious disadvantage of melting or breaking down at relatively low temperatures. For this reason, the prior art was forced to use electrodes of exceedingly large area in order to reduce the current density and the temperature in the vicinity of the electrodes. We have found, however, that certain high melting metals and alloys, such as the metals of the platinum group, are excellently adapted for use as electrodes for the purpose of the present invention. Platinum melts at about 3200° F. which is considerably higher than the melting point of the glass, or the ideal temperatures to which the glass should be heated in order to produce homogeneous, clear, refined glass. Various alloys of platinum or the like may also be used for this purpose as, for example, 90%–10% platinum-rhodium alloys, or platinum-iridium, or the like. Other precious metals, such as ruthenium, osmium, gold, silver, or other metals, may also be added, preferably however, in relatively small amounts, owing to various characteristics of some of these elements, such as volatility or the like. However, metals, such as osmium, in gaseous form are poisonous and should, therefore, be added in sufficiently small quantities to prevent material volatilization. In any event, the electrodes which may be formed of these metals, or alloys thereof, are capable of withstanding exceedingly high temperatures, higher than the melting point of the glasses themselves, and and also without disintegrating or adulterating the glasses to be melted.

By the use of high temperature electrodes, such as suggested, it is possible to materially increase the current density and the temperature in proximity to the electrodes themselves. This permits a high rate of energy dissipation and heat generation within a very small area, within which the heating may be effectively controlled and from which there is a minimum of heat losses.

In addition, hot streaks, which are common in relatively low temperature melting, are avoided. Glass has the characteristic, as noted hereinbefore, of conducting current in proportion, although not uniformly direct proportion to its temperature. That is to say, as the glass becomes hotter and more ionized, its resistance diminishes and a greater amount of current may be conveyed therethrough. This characteristic of glass causes hot streaks. As one portion of the glass becomes slightly hotter than another, a greater portion of the current tends to flow through this portion, making it still hotter. The disproportionate heating, therefore, is thus accentuated and accumulative. If a hot streak should exist between two portions of opposite electrodes, the current would concentrate along this streak and the hot glass would act as a short circuit. Hot streaks not only cause burning out of the furnace, but also interfere with proper melting. As hot streaks are produced they frequently cause a large bubble of gas emanating from the hot glass to be suddenly evolved. This bubble rushes to the surface and permits unmelted batch to descend in its place. The unmelted batch being colder, cannot convey its quota of current and, therefore, remains incompletely melted and heated.

We have successfully avoided hot streaks, however, in our furnace by using very high temperatures of melting. By using high temperatures of melting, as, for example, above the liquidus melting temperature of glass, say 2700° F. or 2800° F. for ordinary lime glasses or even as high as or higher than 3000° F.; we reduce the glass into a very fluid state. Agitation and movement of the glass with a consequent elimination of hot streaks then becomes a simple matter and is automatically effected. As soon as a streak of glass tends to become hotter than a neighboring portion of glass there arises a differential of density between these sections, and in view of the great fluidity of the glass at the high temperatures of melting, the two sections of glass immediately intermix and remove any hot streak which may have tended to form.

Referring more particularly to Figs. 1 and 2, reference character 10 designates a refractory furnace having a compact form. In the drawings, it has been shown as a square-shaped box open at the top to admit batch to be fed therein and having in the floor 11 thereof a feeder outlet 12. In Figs. 1 and 2, a conventional bushing 13 for the omission of a plurality of individual streams of molten glass for the produc'ion of glass wool, has been illustrated. The particular type of feeder, of course, is immaterial in connection with the present invention, it being understood that other types of feeders commonly known and used in the glass art may be incorporated.

Lining opposite walls of the furnace 10, at a convenient distance between the top and bottom thereof, are sheet metal electrodes 15 and 16, respectively. Each of these electrodes preferably extends across the full expanse of the side walls so as to present a maximum area thereacross. Attached to each horizontal extremity of the electrodes 15 and 16 are electrical terminals 17, 18, 19 and 20. The electrical terminals 17 and 18 are provided for the electrode 15, and electrical terminals 19 and 20 are provided for the electrode 16. Water cooling means 22 are preferably provided in proximity to each electrical terminal, in order to prevent rapid deterioration thereof, particularly when these electrical terminals are formed of a low melting alloy, as of copper or the like.

The electrodes 15 and 16 are electrically connected to a regulable source of energy, such as a transformer 25 which is provided with a rheostat 26. The electrical connection between the electrodes 15 and 16 and the transformer 25 includes a double-throw switch 27 adapted to connect the metal plates or electrodes 15 and 16 selectively either as electrodes as such or as resistors. When the switch 27 is placed in position A, the electrodes are in series with the body of glass therebetween and are hooked up in such a manner that the electric current may pass through the glass directly. This hook-up is used only after the glass has been brought up to ionization temperature.

At the start of operations, however, before the glass has been rendered hot enough to carry current, the switch 27 is placed in position B shown in dotted outline. In this position the electrical current travels through the length of each of the metal plates or electrodes 15 and 16, in which hook-up they behave as resistors. The heat generated in the plates 15 and 16 heats the batch or cullet, causes an original melting and ionization and prepares the glass for the normal operation in which the electric current passes directly through the glass as above noted.

The voltages required for each hook-up may vary widely. For example, when starting the operation and the plates 15 and 16 are hooked up as resistors, a relatively low voltage, say, two or three volts, is quite sufficient to bring the plates up to the melting temperature of the glass. The exact voltage, of course, is determined by the particular size and momentary temperature of the electrode. The amperage on the other hand may be extremely high as, for example, many hundreds of amperes.

After the glass has been brought up to ionization temperature and the switch thrown into position B, a considerably higher voltage may be used. Voltages of about 50 to 100 or more volts may be used to convey the currents through the glass, these voltages, of course, being dependent upon the volume and temperature of the glass batch and the rate of melting. Moreover, the volage may vary somewhat during the operation, particularly from the time at which the electrical current is first passed through the glass. At this time the glass is generally at a relatively low temperature, just beginning to be able to convey current, and accordingly a higher voltage is required. However, when the glass becomes thoroughly heated throughout and is in more or less complete ionization, the voltage may be reduced accordingly.

More particularly in regard to the actual melting of the glass, cold batch is fed in at the top and is gradually melted and dissolves in the hot glass as it proceeds downwardly until finally, when it passes between the molten zone between the electrodes 15 and 16, it is completely melted at a temperature as high as 2500° to 2800° F., more or less, according to the rates of melting desired and of the particular type of glass used. These high temperatures, which are made possible by means of the present invention, facilitate complete solution and intermixture of the ingredients of the glass so as to produce a uniform, clear glass which is free from striae or other imperfections. Moreover, we have found that the glass produced by the present invention is extremely clear, bright, almost brilliant, and far superior to glasses produced in the conventional furnaces.

During the downward passage of the glass and as it is heated to a high temperature, the occluded and dissolved gases form bubbles which are permitted to evolve and rise to the surface where they are exhausted. The high temperature to which the glass is subjected facilitates in the removal of these gases.

Referring more particularly to Figs. 3 to 5, a modification has been illustrated. In this embodiment we have shown an elongated horizontal furnace 30 having conventional forehearths 31 at either one or both of the two ends. Conventional dam or skimmer blocks 32 may be provided between the melting chamber of the furnace and the forehearths 31. Feeder outlets 33 of any desired type for various particular purposes may be incorporated in connection with each forehearth 31. Lining each of the side walls 35 of the furnace 30, preferably a convenient distance above the floor of the furnace, are metal plates 36 and 37 respectively. These plates are adapted to be used selectively as electrodes or resistors in the same manner as has been described for electrode plates 15 and 16 shown in Figs. 1 and 2. As in the aforementioned embodiment, we preferably form the metal plates 36 and 37 of a high temperature metal or alloy of the platinum group, although for various low melting glasses other suitable metals or alloys may also be used with the present hook-up. At the horizontal extremities of the metal plate 36 are electric terminals 40 and 41, and at the horizontal extremities of the metal plate 37 are the electric terminals 43 and 44. Each of these electric terminals is preferably provided with water cooling means 45 adapted to maintain the terminals at a sufficiently cool temperature so that a relatively inexpensive metal may be used therefor.

The electrical hook-up provided for metal plates 36 and 37 may be similar to that illustrated in Fig. 1, that is, they may be provided with a single adjustable transformer and switching means adapted to convert the metal plates 36 and 37 selectively to electrical resistors or electrodes. We have illustrated, however, in Fig. 3 another possible combination comprising two transformers 50 and 51, the former primarily adapted to be operated at a relatively high voltage for this type of operation, say, 30 to 200 volts, and the latter primarily adapted to be operated at a low voltage of, say, a few volts. Transformer 50 may be hooked up in series with the plates 36 and 37 and the intervening body of glass in a manner to pass the current directly through the glass and operate the plates 36 and 37 as electrodes. Transformer 51, on the other hand, may be hooked up in such a manner that the electric current may be passed directly through the plates 36 and 37 when serving as resistors. Suitable switching means as, for example, 52, may be provided to throw in or out of operation the transformer 50, and switching means 53 is provided to throw in or out of operation the transformer 51.

Additional switches 54, 55 and 56 are provided in the circuit of the transformer 50 to assist in throwing the latter into or out of operation. During operation of transformer 50, these switches 54, 55 and 56 are closed. Switches 57 and 58, on the other hand, which are incorporated in the circuit, including the transformer 51, are left open during the operation of the transformer 50. When the transformer 51 is in use and transformer 50 is shut off, all these switches are in reverse position so that switches 57 and 58 are closed and switches 54, 55 and 56 are open. In this latter operation, it will be noted that the current passes through the length of the plates 36 and 37 and heats them as resistors.

Other suitable means may, of course, be used as one skilled in the art would readily understand. Moreover, the hook-up of the transformers 50 and 51 may be changed according to suitable recognized electrical designs well known in the art.

The operation of this furnace is similar to that described for Figs. 1 and 2. The cold batch is fed in at the top and is gradually melted as it proceeds downwardly until finally it is melted at a temperature of about 2500° F., more or less, and then it passes under the dam blocks 32 into the refining chambers or forehearths 31. High temperatures of about 2500° to 2800° F., more or less, may be reached inside the furnace in order that the glass may be in complete solution and thoroughly mixed and in order for the gases to readily pass off. After the glass is passed into the refining chambers or forehearths 31, however, the glass may be cooled to about 2250° F., as desired, at which temperature it is generally preferable to feed the glass. Other temperatures, of course, may be obtained in the forehearths according to the purpose for which the glass is to be used, as one skilled in the art would understand.

An advantage present in this type of furnace is the proximity to which the opposite metal plates or electrodes 36 and 37 may be placed. When placed relatively close together, the current is more evenly distributed throughout the length of the furnace to the end that a uniform distribution of heating may be effected and hot streaks may be minimized and actually eliminated. Moreover, the high temperature made possible in the present furnace by the use of high melting alloys of the platinum group brings the glass into thorough and complete solution without causing destruction of the electrodes or causing them to break down and adulterate the glass.

It is possible to modify the present embodiment by incorporating a resistor plate for starting independently of the electrodes. For example, it is possible to incorporate a metal plate similar to metal plate 36 or 37 on the furnace floor and hook this up to a transformer. After the glass has been brought up to operating temperature by the resistor plate, however, it may be shut out and the current then passed directly through the glass via the electrodes 36 and 37. When providing metal plate elements on the floor of the furnace, between the electrodes, it is preferable to construct the electrodes sufficiently high above the floor to prevent short circuiting of the current through the resistor plate.

Referring more particularly to the modified construction shown in Figs. 6 and 7, the furnace comprises end walls, 60, side walls 61, and a bottom or floor 62, all made of refractory material and supported by a metal shell casing 63. Within the furnace is located an electrical resistor 64 which serves both as a baffle and as a heating element for melting and refining the batch 66 which may consist, for example, of various raw materials and/or cullet such as are commonly used for making glass or like materials. Within the resistor 64 is a baffle 65 which extends upwardly from the floor 62 of the furnace and is in register with an outlet opening 67 through which the glass is fed to a feeder 68 of any desired type. In the drawings a feeder for use in making glass wool has been illustrated adapted to feed a plurality of molten streams 90 of glass. It will be understood, however, that any type of feeder may be provided.

The electrical resistor 64 simulates to a certain degree the shape of a conventional log cabin having vertical side walls 64a, end walls 64b, and the top cover portion or roof 64c, the latter comprising upwardly and inwardly inclined convergent walls. A stack or vent 70 extending upward from the roof provides for the escape of gases liberated during the melting and refining of the glass within the resistor 64. The lower end of the resistor 64 is open and spaced above the floor of the furnace.

The inner heating and refining baffle 65 comprises a body of rectangular construction including vertical side walls and end walls, parallel respectively with the side walls 64a and end walls 64b of the resistor element 64 and spaced a distance inwardly therefrom. In the particular construction shown, the side walls of the baffle 65 extend vertically down to the floor of the furnace where they terminate in register with the outlet opening 67 and are integrally united with an outwardly extending flange 71 which overlies the floor 62 of the furnace.

The baffle 65 is preferably provided with a multiplicity of perforations or small openings 72 extending through the walls thereof, said openings being located in the upper portions of said walls. The upper portion of the baffle is thus in the form of a screen which permits the molten glass to flow therethrough but screens out the seeds or gas bubbles. Assisting in the filtering out of foreign particles and occluded gases is the screen 73 which is incorporated within the baffle 65 and is preferably located over the opening 67.

The resistor 64 is electrically heated by means of an alternating current. The current may be supplied through lugs 80 which are preferably integrally united with the end wall 64b of the resistor. Electrical connections by suitable terminals may be made with the lugs 80 as, for example, by copper terminals or the like (not shown).

A proper distribution of the electric current flowing through the heating elements is provided by building up certain portions of the walls by means of conducting material 81 covering certain portions of the walls. This material may be of the same in kind or composition as the walls themselves, and, as shown, consists of strips of such material welded or integrally united with said walls. It is found that when the walls are of uniform thickness throughout, there is an uneven distribution of the electric current flowing therethrough, and an uneven distribution of the heat produced by said current. There is a tendency toward excessive heating adjacent the lugs and upward and also a lack of sufficient heating of the lower portions of the walls 64a. By a suitable distribution and arrangement of the conducting elements 81, this difficulty is overcome and satisfactory heat distribution maintained.

Lining the side walls 61 on opposite sides of the furnace and preferably, for purposes of economy, a convenient distance below the normal surface level of the batch, are electrodes 91 and 92 respectively. The lower ends of these electrodes are shown attached integrally to terminals 93 and 94 which extend outward through the end walls 71. Other means of providing electric terminals for the electrodes 91 and 92 may also be provided if desired. Each of the terminals 93 and 94 is provided with copper or other suitable leads 95 and 96 respectively which serve to introduce electrical current at suitable voltages to the electrodes.

The metal portions within the furnace, namely, the electrodes 91 and 92, the resistor 64, the baffle 65 and the screen 73 and other metal elements which may be provided within the furnace, are made of a suitable metal or metal alloy adapted to withstand the high temperatures to which they are subjected and resistant to the chemical action of the materials acted upon whether they are basic or acid in composition. For this purpose I preferably use a platinum alloy, the various metals making up the alloy being preferably chosen from the platinum group although other metals, of course, may be compounded therewith in producing a strong, chemically resistant metal having a melting point higher than that of the liquidus melting temperature of the glass and preferably as high as or higher than 3200° F.

The operation of the apparatus shown in Figs. 6 and 7 may be described as follows: The batch 66 consisting of raw materials is introduced through the top of the furnace and gradually works downward during the melting process. Particularly in the start of the operation, the walls 64a are maintained by the electric current at a sufficiently high temperature to melt the materials moving downwardly in contact therewith or closely adjacent thereto. Almost all of the heat radiated by the walls 64a is absorbed by the batch or the material interposed between the same and the opposite walls 61 of the furnace. The molten glass passes beneath the lower end of the walls 64a and moves upwardly between said walls and those of the baffle 65.

The passageway between the walls of the two heating elements is quite narrow so that the glass moves upward substantially in sheet formation and is raised to a high temperature at which it is in a highly liquid condition. This high temperature facilitates the ready escape of the seeds or gases which pass upwardly and may be discharged through the stack 70.

The highly fluent glass passes through the screen or opening 72, said opening serving to screen out or prevent the passage therethrough of any gas bubbles, seeds or foreign matter which may happen to pass within the resistor 64. These seeds are retained in substantially spherical form owing to the surface tension which prevents them from elongating and passing through the openings 72.

The glass which passes through the screen or openings 72 flows downwardly over the inner surface walls of the baffle 65 in the form of a thin layer or sheet and accumulates in a well formed by the feeder 68. This provides a pool or supply body of refined glass which issues through the outlets in the feeder.

After the operation has been started so that the glass between the electrodes 91 and 92 has been raised to a sufficiently high temperature to be ionized, the glass becomes a conductor of electricity. At this time the electric current may be passed through the glass directly by means of the electrodes 91 and 92. The current thus introduced into the ionized glass serves to bring it up to liquidus temperature within a very short time and thus largely increases the capacity and efficiency of the unit as a whole.

By using the electrodes 91 and 92, in conjunction with the resistor 64, increased efficiencies are achieved. By using this method the electric energy is converted to heat which is generated ubiquitously within the glass itself rather than merely at one surface thereof which would necessitate a gradual conduction of the heat through the body of glass. Thus, by ubiquitous heating, the rate of energy dissipation may be markedly increased. Moreover, in view of the fact that the heat is generated within the bath of molten glass itself, the radiation of heat tends to flow outwardly and upwardly to the surface of the bath counter-concurrent to the introduction of batch. The fresh batch thus arrests the radiation of heat and conserves a major portion of the heat which otherwise would be wasted. Another factor tending toward greater efficiency made possible by the present invention is the fact that in passing current directly through the glass itself, a higher voltage, generally in the neighborhood of 30 to 150 volts, is necessary, which results in a saving in electrical transmission to the melter itself owing to the reduction in the transmission losses present in heavy current conductors.

It will be observed that the glass forming materials are caused to move in a zigzag path during the melting and refining processes. The raw batch first moves downwardly along the exterior surface of the resistor 64, thence upwardly between the walls of the resistor 64 and the baffle 65, and then downwardly again within the walls of the baffle 65. During this movement the material is subjected to graduated temperature zones, the lowest temperature being exterior of the resistor 65 and the highest temperature within the resistor 65. The zig-zag flow of molten glass also assures a rapid and complete elimination of gases and foreign matters.

It will be observed that the present invention provides a method and apparatus which produce an exceedingly high throughput of glass in relation to the size of the melting space. This results from the high rate of energy liberation per unit melting space with a minimum of radiating surface. The resulting high rate of glass flow through the furnace eliminates the tendency of the current to produce and pass through hot streaks of glass because the high rate of glass flow automatically removes the streaks by causing them to be agitated and intermixed with glass at a lower temperature. Moreover, the high temperatures present in our furnace made possible by the use of high temperature alloys causes the glass to be rapidly reduced into a very fluid state, this also militating against the maintenance of hot streaks.

Modifications may be resorted to within the spirit and scope of the appended claims.

We claim:

1. The method of melting and refining glass or similar material which comprises establishing a body of said material, providing a localized electrical heating in an interior zone of said body to render the material in said zone very fluid and above the liquidus melting temperature of the glass, causing the material surrounding said zone to be initially heated by transmission of heat from the interior portions of said material and thereby brought to a sufficiently high temperature at which it will convey current, passing an electrical current from an external independent source through the said surrounding material after it has been raised to said temperature at which it will convey current, causing said fluid material in said interior zone to be discharged, feeding said surrounding portions into said interior zone to replace the discharged fluid material, and feeding unmelted material into position to replace said material fed into the interior zone.

2. The method of melting and refining glass or similar material which comprises establishing a body of said material, providing a localized electrical heating in an interior zone of said body to render the material in said zone very fluid and above the liquidus melting temperature of the glass, causing the molten material to flow in sheet-like formation through said interior zone, causing said fluid material in said interior zone to be discharged, causing the material surrounding said zone to be initially heated by transmission of heat from the interior portions of said material and thereby brought to a sufficiently high temperature at which it will convey current, passing an electrical current from an external independent source through the said surrounding material after it has been raised to said temperature at which it will convey current, feeding said surrounding portions into said interior zone to replace the discharged fluid material, and feeding unmelted material into position to replace said material fed into the interior zone.

3. The method of melting and refining glass or similar material which comprises establishing a body of said material, providing a localized electrical heating in an interior zone of said body to render the material in said zone very fluid and above the liquidus melting temperature of the glass, causing the material to flow through said interior zone in a stream having a thin cross-section which is exposed to a gaseous medium whereby the gases within the material may be evolved into said gaseous medium, causing said fluid material in said interior zone to be discharged, causing the material surrounding said zone to be initially heated by transmission of heat from the interior portions of said material and thereby brought to a sufficiently high temperature at which it will convey current, passing an electrical current from an external independent source through the said surrounding material after it has been raised to said temperature at which it will convey current, feeding said surrounding portions into said interior zone to replace the discharged fluid material, and feeding unmelted material into position to replace said material fed into the interior zone.

4. An electric furnace for melting and refining glass or similar materials, which comprises a container for a batch of raw materials, a heating element within said container in position to be surrounded by the batch and in direct contact with the glass, means for supplying electric current to said element and thereby heating said element and the said material in proximity to said element to a high temperature at which the material is very liquid, and electrodes exterior of said element and submerged in said material to pass an electric current directly through said material.

5. Apparatus for melting and fining glass making materials, comprising a container for batch of the raw materials, a sheet metal resistor within said container in position to be surrounded by the batch and in direct contact with the glass, means for passing a current through said resistor, and spaced metal electrodes within said container and exterior of said resistor, said electrodes adapted to pass current directly through said materials.

6. Apparatus for melting and fining refractory materials, comprising a container for batch of the raw materials, a sheet metal resistor within said container in position to be surrounded by the batch materials, said resistor being formed of spaced apart walls and being open at the lower end thereof, a hollow sheet metal baffle located within said resistor and having an outlet opening at the bottom thereof, and spaced electrodes exterior of said resistor adapted to pass a current directly through said materials and cause a generation of heat therein, said resistor and baffle being so arranged that the materials flow into said resistor from the bottom thereof and pass upwardly therein and then flow downwardly again through said baffle to be discharged.

7. Apparatus for melting and fining refractory materials, comprising a container for batch of the raw materials, a sheet metal resistor within said container in position to be surrounded by the batch materials, said resistor being formed of spaced apart walls and being open at the lower end thereof, a hollow sheet metal baffle located within said resistor and having an outlet opening at the bottom thereof, and spaced electrodes exterior of said resistor adapted to pass a current directly through said materials and cause a generation of heat therein, said resistor and baffle being so arranged that the materials flow into said resistor from the bottom thereof and pass upwardly therein and then flow downwardly again through said baffle to be discharged, said electrodes being formed of a platinum group metal alloy capable of withstanding temperatures higher than the melting temperatures of glass, whereby the electric current may be introduced into said glass adjacent to said electrodes at a high temperature in the neighborhood of the fusing temperature of the materials.

8. The method of melting and refining glass or similar material by a continuous process which comprises establishing a body of said material, dissipating localized electrical energy within an interior zone of said body and thereby supplying heat to the material within said zone sufficient to render the material in said zone highly fluid, causing the material surrounding said zone to be initially heated by the transmission of heat from said zone, to a temperature at which it will convey electric current, passing an electric current through said surrounding material from an independent external source after said surrounding material has been raised to a temperature at which it will convey current, causing said fluid material to be continuously discharged from said interior zone, feeding said surrounding portions of material continuously inward to replace said discharged material, and feeding unmelted batch into position to replace that fed into the interior zone.

9. The method of melting and refining glass or similar material by a continuous process which comprises establishing a body of said material, dissipating localized electrical energy within an interior zone of said body and thereby supplying heat to the material within said zone sufficient to render the material in said zone highly fluid, causing the material surrounding said zone to be initially heated by the transmission of heat from said zone, to a temperature at which it will convey electric current, passing an electric current through said surrounding material from an independent external source after said surrounding material has been raised to a temperature at which it will convey current, causing said fluid material while within said interior zone to flow in thin sheet formation through a gaseous medium having a temperature sufficiently high to prevent surface chilling of the material and thereby permitting a free escape of bubbles and dissolved gases from the material and thereby effecting the rapid fining of the material, causing said fluid material to be continuously discharged from said interior zone, feeding said surrounding portions of material continuously inward to replace said discharged material, and feeding unmelted batch into position to replace that fed into the interior zone.

FLAVIUS W. ATKINSON.
DALE KLEIST.
GAMES SLAYTER.
JOHN H. THOMAS.
GEORGE M. LANNAN.